United States Patent [19]
Weber

[11] 3,979,914
[45] Sept. 14, 1976

[54] PROCESS AND APPARATUS FOR SUPERHEATING PARTLY EXPANDED STEAM

[75] Inventor: Max Weber, Wiesendangen, Switzerland

[73] Assignee: Sulzer Brothers Limited, Winterthur, Switzerland

[22] Filed: June 3, 1975

[21] Appl. No.: 583,286

[30] Foreign Application Priority Data
June 6, 1974   Switzerland......................... 7765/74

[52] U.S. Cl.................................... 60/644; 60/653; 60/677; 60/678; 60/679; 60/680
[51] Int. Cl.² .................... F01K 13/00; F01K 17/00
[58] Field of Search ............. 60/644, 653, 677, 678, 60/679, 680

[56] References Cited
UNITED STATES PATENTS
| | | | |
|---|---|---|---|
| 1,660,612 | 2/1928 | Hartmann | 60/680 |
| 1,889,307 | 11/1932 | Baumann | 60/680 |

*Primary Examiner*—Allen M. Ostrager
*Attorney, Agent, or Firm*—Kenyon & Kenyon Reilly Carr & Chapin

[57] ABSTRACT

The steam which is produced by the steam generator in the secondary coolant circuit of the nuclear reactor power plant is partly expanded in a turbine and delivered to a reheater. A part of the superheated steam is tapped off from an upstream portion of the steam turbine and then cooled to a saturated steam condition. This saturated steam is then passed into the reheater to reheat the flow of partly expanded steam via a heat exchange.

11 Claims, 8 Drawing Figures

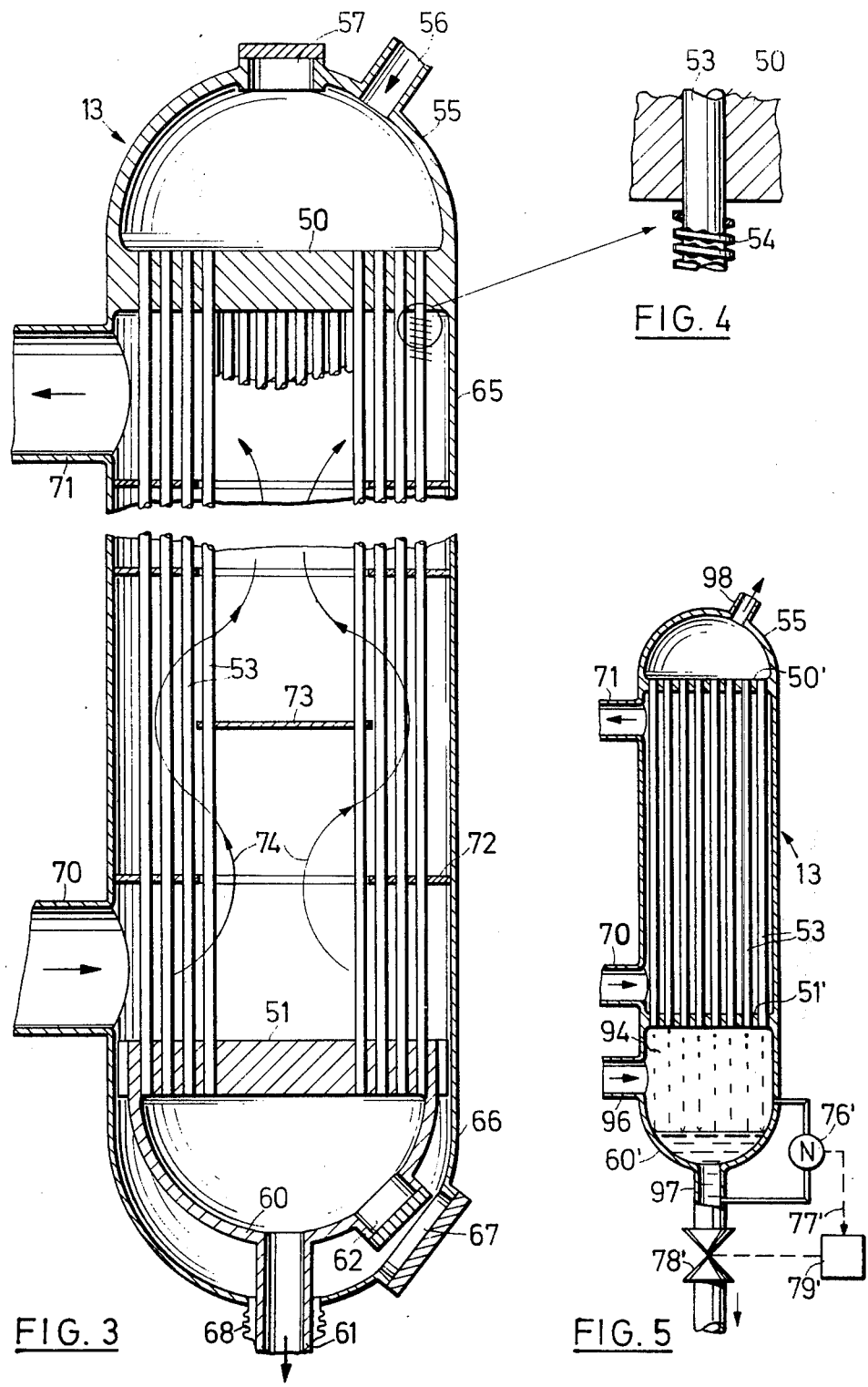

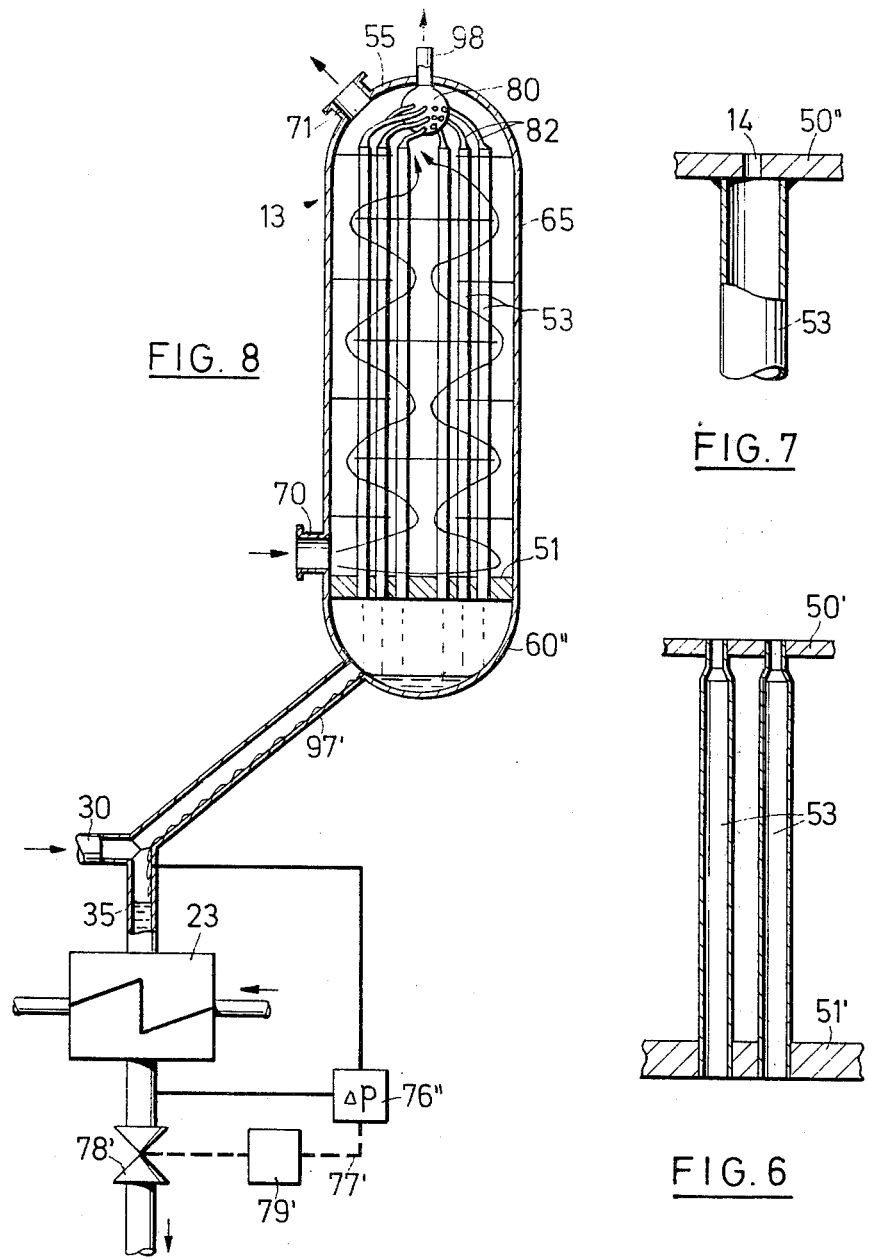

PROCESS AND APPARATUS FOR SUPERHEATING PARTLY EXPANDED STEAM

This invention relates to a process and apparatus for re-heating partly expanded steam. More particularly, this invention relates to the re-heating of a partly expanded steam of a steam turbine of a nuclear reactor power plant.

Heretofore, various techniques have been known for re-heating steam which has been partly expanded in a steam turbine of nuclear power plants. Generally, these techniques have relied upon the use of high pressure steam in a superheated condition as the heating medium for heating the partly-expanded steam. However, this requires the re-heaters in which the heating takes place to be made of materials resistant to high temperatures as well as of large surface area in order to carry out the heat exchange. Further, as the heating medium would be of higher pressure than the partly-expanded steam to be re-heated, these techniques have usually not been favored for gas-cooled high-temperature reactors.

Accordingly, it is an object of this invention to improve the re-heating of a partly-expanded steam flowing from a steam turbine of a nuclear reactor power plant.

It is another object of the invention to decrease the heating surface for heating of a partly-expanded steam from a steam turbine of a nuclear power plant.

It is another object of the invention to use cheaper and less heat-resistant materials for a re-heater for heating a partly-expanded steam of a secondary coolant circuit of a nuclear reactor power plant.

It is another object of the invention to provide a process of re-heating a flow of partly-expanded steam which can be used in a gas-cooled high-temperature reactor plant.

Briefly, the invention provides a process and apparatus for re-heating a partly-expanded steam with steam at a saturated condition. To this end, the process comprises the known steps of generating a flow of superheated steam in a steam generator, partly expanding the steam flow in a steam turbine downstream of the generator and delivering the flow of partly expanded steam to one side of a re-heater. In addition, the process comprises the steps of tapping off a part-flow of the superheated steam from the flow path between the steam generator and re-heater, cooling the tapped superheated steam to a saturated steam condition and then passing the saturated steam into another side of the re-heater for heating the flow of partly expanded steam in the re-heater in a heat exchange relation.

The apparatus is directed to a power plant having a steam generator for generating a flow of superheated steam and a steam turbine for receiving and expanding the flow of superheated steam. The apparatus includes a re-heater connected to the turbine to receive a flow of partly expanded steam therefrom and means for tapping off a part-flow of the superheated steam from between the steam generator and re-heater to flow in heat exchange relation with the flow of partly expanded steam in the superheater. This means includes a cooler for lowering the temperature of the tapped-off superheated steam to a saturated steam condition prior to entry into heat exchange relation with the flow of partly expanded steam.

The power plant is generally constructed with a nuclear reactor, a reactor coolant circuit for circulating a primary coolant through the reactor and a secondary coolant circuit for circulating water in heat exchange relation with the primary coolant. This secondary coolant circuit embodies the above steam generator, turbine and reheater.

The cooler may be in the form of an injection cooler to which water is added for example from the secondary coolant circuit or from the condensate produced by the re-heater.

These and other objects and advantages of the invention will become more apparent from the following detailed description and appended claims taken in conjunction with the accompanying drawings in which:

FIG. 1 schematically illustrates a nuclear power plant for carrying out the process of the invention;

FIG. 2 schematically illustrates a part of a modified plant according to the invention;

FIG. 3 illustrates a vertical sectional view through a re-heater according to the invention;

FIG. 4 illustrates to a larger scale a detail of the re-heater of FIG. 3;

FIG. 5 illustrates a vertical sectional view through a modified re-heater according to the invention;

FIG. 6 illustrates a modified detail of the re-heater of FIG. 5;

FIG. 7 illustrates a further modified detail of the re-heater of FIG. 5; and

FIG. 8 illustrates a vertical sectional view through a further modified re-heater according to the invention.

Figure 1:
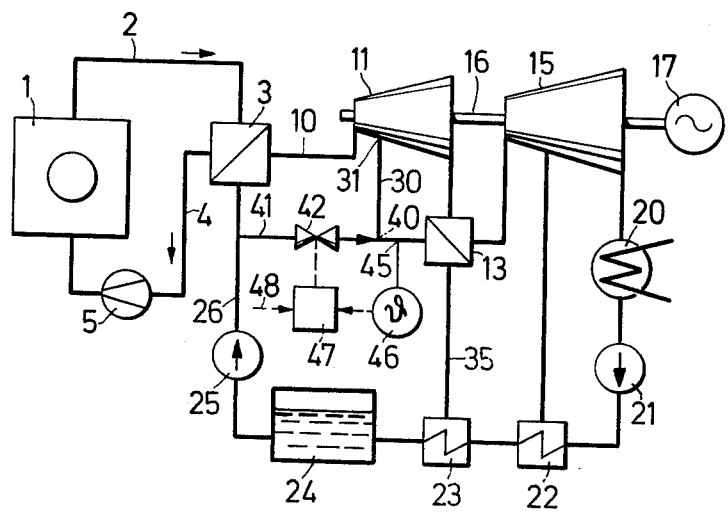

Referring to FIG. 1, a helium-cooled nuclear reactor 1 of a nuclear power plant is connected with a reactor coolant circuit for circulating helium, as a primary coolant, through the reactor 1. This coolant circuit cooperates with a steam generator 3 and includes a conduit 2, which conducts the helium heated in the reactor 1 to a primary side of the steam-generator 3, in which the heat from the reactor coolant is conducted to the working medium of a secondary coolant circuit. The cooled-down helium is returned to the reactor 1 over a conduit 4 and by means of a circulating organ 5, such as a pump, to once more receive the heat liberated by a nuclear reaction.

The secondary side of the steam-generator 3 is in the secondary coolant circuit which includes a live steam conduit 10 which connects the generator 3 with a high pressure stage 11 of a steam turbine which, together with a low-pressure stage 15, drives an electric generator 17. The secondary coolant circuit also has re-heater 13 between the high-pressure stage 11 and the low-pressure stage 15 of the steam turbine for receiving the partly expanded steam from the high-pressure stage 11.

The steam expanded in the low-pressure stage 15 is condensed in a condenser 20 of the circuit from which the condensate, by means of a pump 21, goes by way of two preheaters 22, 23 into a feed-water tank 24. This feed-water tank 24 is connected to the secondary side of the steam-generator 3 over a conduit 26 in which a feed-pump 25 is installed. The preheater 23 is connected over a conduit 35 with the primary side of the re-heater 13.

A means, such as a conduit 30, is connected to a tap 31 near the upstream end of the high pressure turbine stage 11 for tapping off a part-flow of the superheated steam to subsequently flow in heat exchange relation with the partly-expanded steam. The tap 31 is situated at a point to provide steam which is superheated and at a pressure higher than that of the partly expanded steam flowing to the re-heater 13 from the outlet of the turbine stage 11. This means also includes a cooler 40, such as an injection cooler, in the conduit 30 for lowering the temperature of the tapped off steam to a saturated steam condition prior to entry into the re-heater 13.

The cooler 40 is connected with the feed-water line 26 between the feed-pump 25 and steam-generator 3, by a conduit 41, in which an injection-valve 42 is provided. This injection-valve 42 is controlled by a regulator 47 to which a desired value of temperature is conducted over a signal line 48 along with an actual-value signal of the temperature of the heated hot steam in the conduit 30 measured at a location 45 in the conduit 30 by a temperature-senser 46. The desired value, conducted over the signal line 48, may for example depend on the pressure of the hot steam ahead of the cooler 40, or may vary in accordance with the load on the plant.

The tap 31 in the steam circuit is selected so that the hot steam flowing through the conduit 30, and cooled in the cooler 40 condenses in the re-heater 13, and so that the steam emerging at the secondary side from the re-heater has the desired re-heating temperature.

During operation, sufficient injection water is supplied to the cooler 40 through the conduit 41 for the superheated steam removed at location 31 to be almost completely cooled at the temperature-measuring location 45, i.e. at a temperature about 3° higher than the saturated-steam temperature corresponding to the steam pressure in the conduit 30. Because the measuring location 45 is situated near the cooler 40, not all the injected water is vaporized. That occurs in the section of conduit 30 between the measuring location 45 and the entry into the re-heater 13. By this later vaporization, the heating steam at the entry into the re-heater 13 is practically completely cooled, i.e. the steam has the saturated steam condition $x = 0$. Thus, the partly expanded steam is heated by condensing of the steam supplied via the conduit 30. In this way, higher heat-transfer values occur than if superheated hot steam were used for heating purposes.

The condensate produced in the re-heater 13 is conducted through the conduit 35 to the preheater 23, where the heat becomes transmitted to the condensate coming from the condenser 20.

Figure 2:
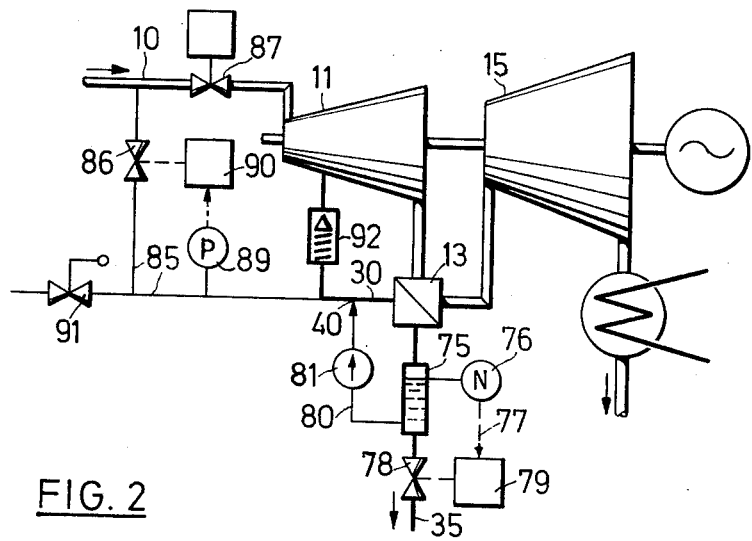

Referring to FIG. 2, wherein like reference characters indicate like parts as above, the heating steam outlet of the re-heater 13 is connected to a water-collecting tank 75 which is provided with a measuring device such as a level-indicator 76. This measuring device 76 is connected via a signal line 77 with a regulator 79 which acts on a valve 78 disposed in the conduit 35. A conduit 80 is also connected to the collection-tank 76 which leads to the cooler 40. This conduit 80 is provided with a circulating pump 81 which is dimensioned to send enough water to the cooler 40 from the collection-tank 75 for the heating steam entering the re-heater 13 to be always wet. The valve 78 opens when the level in the collecting-tank 75 moves about a certain limit-value.

To ensure that the temperature of the re-heated steam is high enough under partial load when the pressure of the heating steam decreases, the conduit 30, upstream of the cooler 40, is connected via a conduit 85 with a valve 86 for the live steam line 10 upstream of a turbine-valve 87. A pressure senser 89 is also connected to the conduit 85 which acts on the valve 86 over a limit-regulator 90 in such a way that when falling short of a limit value set on the regulator 90 for the pressure, the valve 86 becomes opened to such an extent that the pressure deviation is minimal.

In the event that the pressure-regulating system 86, 89, 90, should not function, the conduit 85 is provided with a safety valve 91. A check-valve 92 is also installed in the conduit 30 upstream of the connection place of the conduit 85 to prevent steam from passing through the conduit 85 into the high-pressure stage 11 when the valve 86 is open.

Referring to FIGS. 3 and 4, the re-heater 13 consists of a cylindrical shell 65 provided with the tube-plates 50, 51 at both ends between which extend tubes 53 with their ends rolled tightly or welded into the tube plates 50, 51. The tube-plate 50 is joined tightly to the shell 65 while the tube-plate 51 can move axially in the shell 65 in order to permit expansion movements between the tubes 53 and the shell 65. As FIG. 4 shows, the tubes 53 are provided with helical ribs 54 for increasing the outer heat-transmission surface. The two ends of the cylindrical shell 65 are connected to hemispherical bottoms 55, 66. The bottom 55 has a supply-connector 56 for the hot steam, and also a manhole 57. The bottom 66 is provided with a manhole 67 and has a hemispherical bottom 60 disposed therein which is tightly connected with the tube-plate 51 and with an outlet-connector 61 for the condensate produced in the re-heater. A manhole 62 is also provided in the bottom 60. The outflow connector 61 is tightly connected by a corrugated tube 68 to the outer bottom 66.

A supply-connector 70 for the partly expanded steam to be reheated is connected to the shell 65 along with an outflow connector 71 for the re-heated steam. Alternating annular and disk-shaped baffles 72, 73 are respectively disposed in the space between the two tube-plates 50, 51.

In operation, the steam to be re-heated enters through the supply connector 70 and flows round the tubes 53 in the direction shown by the illustrating arrows 74 and after heating flows out the outflow connector 71. The heating steam enters in a saturated condition through the supply-connector 56, flows at a low speed through the tubes 53 and condenses on the inner walls of the tubes 53. The condensate collects on the bottom 60 and flows through the connector 61 and the conduit 35 (FIG. 1) to the preheater 23.

Referring to FIG. 5, the re-heater 13 may be modified. As shown, the re-heater 13 is constructed similarly to that of FIG. 3, i.e. the tubes 53 extend between two tube-plates 50' and 51', and the shell surrounding the tubes is provided with a supply-connector 70 for the steam to be reheated and with an outflow connector 71 for the re-heated steam. However, the re-heater is modified so that the cooler and the re-heater form a constructional unit. To this end, the supply-connector 96 for the hot steam and the outflow connector 97 for the condensate are provided at the same side of the re-heater 13; the two connectors 96, 97 being connected to the lower portion 60'. The space 94 between the level of the condensate and the lower tube-plate 51' then forms the cooler so that the condensate, produced in the tube 53 by the cooling-down of the hot steam, cools the hot steam before entry of the steam into the tubes 53.

The outflow connector 97 is provided with a valve 78' being influenced by a level-regulator 79' which is connected over a signal-line 77' to a level-measuring device 76'. The upper hemispherical bottom 55 is provided with a venting connector 98 which is, for example, connected with a deaerator on the feed-water tank 24, or with the condenser 20. A small amount of the hot steam may be removed periodically or continuously through the connector 98.

Referring to FIG. 6, the tubes 53 are contracted at their upper end as viewed to a smaller diameter and fastened tightly into the tube-plate 50'. In this way, the thickness of the tube-plate can be substantially decreased.

Another form of construction which leads to the same result is shown by FIG. 7 in which the tubes 53 end bluntly at the tube-plate 50'', and are welded to the tube plate 50'' by a filletseam. The tube-plate 50'' has a hole 14 at each tube 53 of a diameter substantially smaller than that of the tube 53 so that a small amount of steam can escape through this hole to the venting-connector 98.

Referring to FIG. 8, the re-heater 13 may also have straight tubes which are fastened tightly in a lower tube-plate 51' while at the upper end of the tubes 53, no tube-plate is provided. Instead, the tubes 53 merge into bent tube-sections 82 of smaller diameter having their outlet into a spherical collector 80. This collector 80, in turn, has an outlet into the venting connector 98. Because of the bent tubular sections 82, expansion may easily occur between the tubes 53 and the shell 65 of the intermediate superheater.

As shown in FIG. 8, the outflow connectors 71 for the reheated steam are set in the hemispherical bottom 55. The lower bottom 60'' of the re-heater is connected to a slanting conduit-section 97' which serves as an outlet for the condensate from the cooled-down heating steam, and as a desuperheater for the heating steam. For this purpose, the conduit 30 is connected to the lower end of the slanting conduit 97' so that the superheated heating steam flows, counter to the condensate descending under the action of gravity, toward the re-heater 13. The lower end of the slanting section 97' merges into the conduit 35, in which the preheater 23 is disposed so that the condensate flowing toward the feed-water tank 24 from the condenser 20 becomes heated. A valve 78' is also disposed in the conduit 35 downstream of the preheater 23 which, as in FIG. 5, is influenced by the level of the condensate coming from the hot steam. As indicated, the level is measured by the aid of a Δp meter 76'' and a corresponding signal is sent over a line 77' to the regulator 79' which controls the valve 78'.

The invention thus provides a process and apparatus in which a superheated heating steam, before giving its heat to a partly expanded steam to be reheated, is cooled down to such an extent as to enter as saturated steam into the reheater.

Although the mean temperature drop of the heating steam is decreased in the re-heater due to the prior cooling of the steam, it might be expected that the heating surface should be increased. However, the heating surface is instead decreased. This is because at the primary side, the low flowspeed that occurs for the condensing heating steam gives a far better heat transfer than superheated heating steam.

A further advantage of the invention is that there are lower temperatures and smaller temperature-differences in the re-heater. This permits use of cheaper and less heat-resistant material for the re-heater. Furthermore, the heat-stresses in the reheater are smaller.

In addition, the process of the invention can be used in plants having gas-cooled high-temperature reactors. In this case, should leakage occur in the re-heater, since the steam would be at a higher pressure than the gas, the gas would not enter the flow of steam.

What is claimed is:

1. A process of re-heating steam comprising the steps of
   partly expanding a flow of superheated steam in a steam turbine;
   delivering the partly-expanded flow of steam to be reheated to a reheater;
   extracting a part of the superheated steam from an upstream portion of the steam turbine in a superheated condition;
   cooling the extracted part of the superheated steam from the superheated condition to a saturated steam condition; and
   then placing the saturated steam in heat exchange relation with the partly-expanded flow of steam in the re-heater for re-heating of the partly-expanded flow of steam.

2. A process for the re-heating of steam which comprises the steps of
   generating a flow of superheated steam in a steam generator;
   partly expanding the flow of superheated steam in a steam turbine downstream of the steam generator;
   delivering the flow of partly expanded steam to one side of a reheater;
   tapping off a part-flow of the superheated steam from the flow path between the steam generator and reheater;
   cooling the tapped part-flow of superheated steam to a saturated steam condition; and
   then passing the saturated steam into another side of the re-heater for re-heating the flow of partly expanded steam in the re-heater in a heat exchange relation.

3. A nuclear power plant comprising
   a steam generator for generating a flow of superheated steam;
   a steam turbine for receiving and partly expanding the flow of superheated steam, said turbine having a tap for extracting steam from an upstream end thereof;
   a re-heater connected on one side to said tap to receive a flow of extracted steam therefrom and on another side with said turbine to receive the flow of partly expanded steam therefrom in heat exchange relation with the extracted steam; and
   a cooler between said tap and said re-heater for cooling the extracted steam to a saturated steam condition prior to entry into heat exchange relation with the partly expanded steam.

4. A nuclear power plant as set forth in claim 3 wherein said cooler is an injection cooler.

5. A nuclear power plant as set forth in claim 3 further comprising a conduit connected to said steam generator and a feed pump for feeding cooling water to said steam generator through said conduit, said cooler being connected to said conduit downstream of said pump to receive water therefrom.

6. A nuclear power plant as set forth in claim 3 further comprising a condensate collecting tank for receiving condensate from said re-heater and a circulating pump for connecting said tank to said cooler.

7. A nuclear power plant as set forth in claim 3 wherein said cooler is a conduit section connected on a primary side to said re-heater, said conduit being disposed to allow the condensate produced during cooling of the extracted steam to flow under gravity in counterflow relation to the flow of extracted steam.

8. A nuclear power plant as set forth in claim 3 wherein said cooler and said re-heater form a single structural unit, said unit having an inlet for supplying the extracted steam and an outlet for removing condensate, said inlet and said outlet being disposed below said re-heater and connected to a common space whereby the condensate produced by cooling of the extracted steam drips from said re-heater through the flow of extracted steam.

9. In a power plant having a steam generator for generating a flow of superheated steam and a steam turbine for receiving and expanding the flow of superheated steam, the combination of
   a re-heater connected to said turbine to receive a flow of partly expanded steam therefrom, and
   means for tapping off a part flow of the super-heated steam from between said steam generator and said reheater to flow in heat exchange relation with the flow of partly expanded steam in said reheater, said means including a cooler therein for lowering the temperature of the tapped-off super-heated steam to a saturated steam condition prior to entry into heat exchange relation with the flow of expanded steam.

10. A nuclear power plant comprising
    a nuclear reactor;
    a reactor coolant circuit for circulating a primary coolant through said reactor;
    a secondary coolant circuit for circulating water in heat exchange relation with the primary coolant of said reactor coolant circuit, said secondary coolant circuit including a steam generator receiving the primary coolant and water in heat exchange relation to produce a superheated steam, a steam turbine for receiving and expanding the superheated steam, and a re-heater connected to said turbine for receiving a flow of partly expanded steam; and
    means for tapping off a part-flow of the superheated steam from between said steam generator and said reheater to flow in heat exchange relation with the flow of partly expanded steam in said re-heater, said means including a cooler therein for lowering the temperature of the tapped-off superheated steam to a saturated steam condition prior to entry into heat exchange relation with the flow of partly expanded steam.

11. A nuclear reactor plant as set forth in claim 10 wherein said turbine includes a high pressure stage and a downstream low pressure stage and the secondary side of said re-heater is connected in the flow path of partly expanded steam therebetween.

* * * * *